United States Patent [19]

Kuhns

[11] Patent Number: 4,460,214
[45] Date of Patent: Jul. 17, 1984

[54] VEHICLE SIDE EXTENSION

[75] Inventor: Abe B. Kuhns, Arthur, Ill.

[73] Assignee: E-Z Trail, Inc., Arthur, Ill.

[21] Appl. No.: 354,451

[22] Filed: Mar. 3, 1982

[51] Int. Cl.³ .............................................. B62D 33/00
[52] U.S. Cl. ...................... 296/33; 296/36; 296/29; 296/181; 296/15; 105/409; 105/379; 220/4 A
[58] Field of Search .................................. 296/32–34, 296/36, 29, 30, 26, 180, 181, 183, 184, 187, 203, 10, 15; 220/4 A, 5 A, 75; 105/247, 379, 404, 409, 424

[56] References Cited

U.S. PATENT DOCUMENTS

| | | | |
|---|---|---|---|
| 803,312 | 10/1905 | Streib | 105/247 |
| 1,587,552 | 6/1926 | Press | 296/184 |
| 2,555,288 | 5/1951 | Krugar | 296/15 |
| 2,771,208 | 11/1956 | Chovanes | 220/4 A |
| 3,163,463 | 12/1964 | Femrite | 296/184 |
| 3,246,313 | 4/1966 | Weaklend | 296/15 |
| 3,944,275 | 3/1976 | Lee et al. | 296/183 |
| 4,092,039 | 5/1978 | Lutkenhouse | 296/181 |

OTHER PUBLICATIONS

Bradford Industries Publication, Model 335 Deluxe with Rocking Bolster, Nov. 1980, supplied by applicant.

Primary Examiner—Robert B. Reeves
Assistant Examiner—Dennis H. Pedder
Attorney, Agent, or Firm—Lockwood, Dewey, Alex & Cummings

[57] ABSTRACT

A side extension for increasing the volumetric capacity of a vehicle body includes an elongate wall, a first flange extending longitudinally of the wall and bent inwardly of the body from the wall along a bottom edge of the wall and at a sloped incline to the wall, and a second flange bent from the edge of the first flange and extending backward toward the wall. The second flange is fastened to a flange on the vehicle body which extends inwardly of the body. The first and second flanges substantially define a "V" in cross section increasing the strength of the side extension walls, maximizing the capacity of the vehicle body and preventing retention of material carried by the vehicle body at the junction between the side extensions and the vehicle body.

24 Claims, 4 Drawing Figures

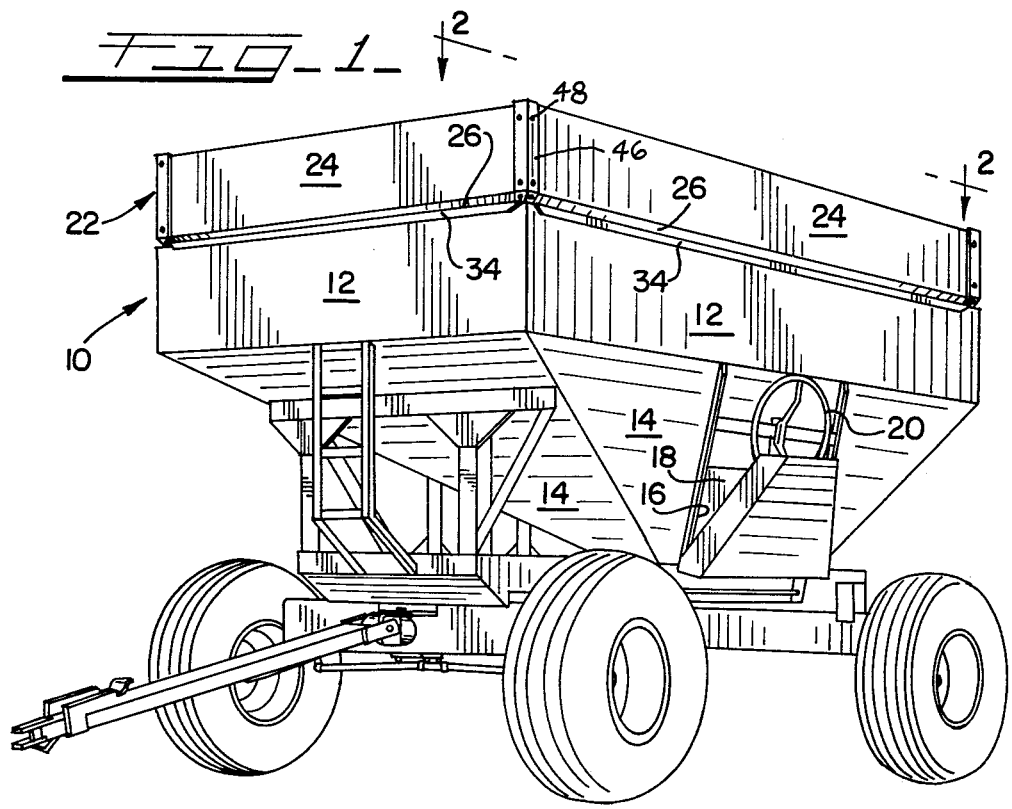
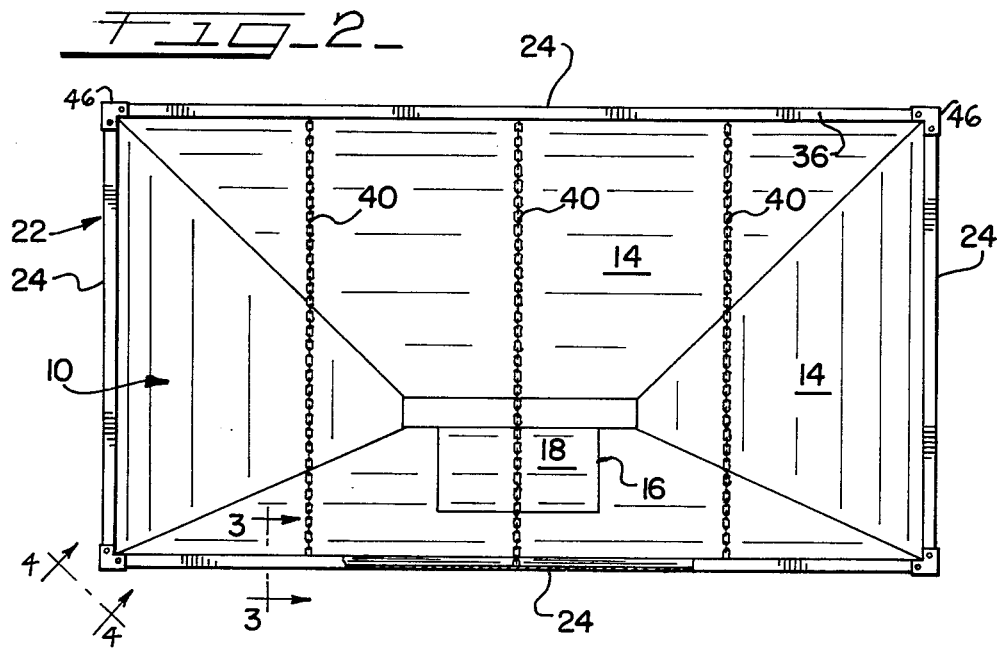

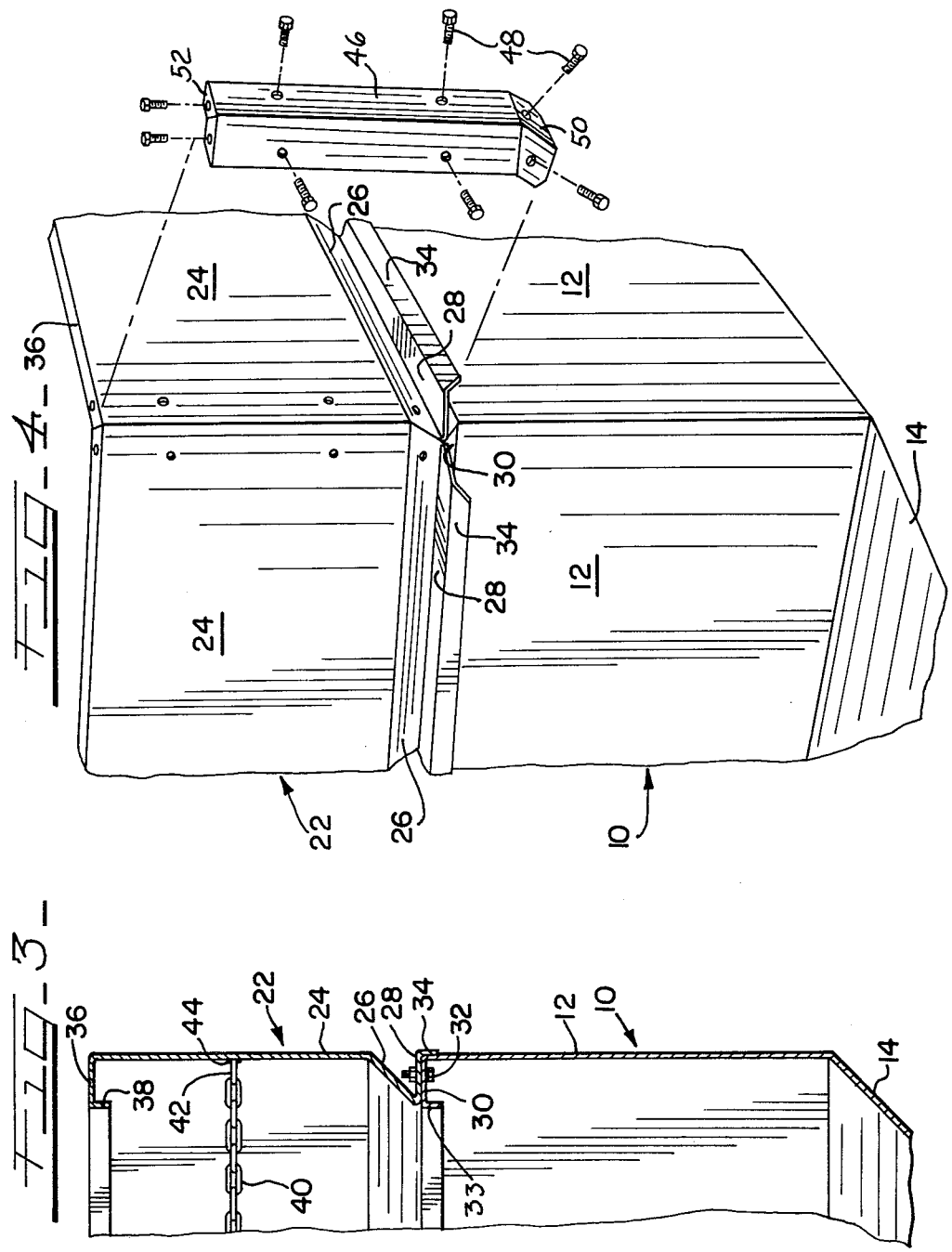

VEHICLE SIDE EXTENSION

BACKGROUND AND SUMMARY OF THE INVENTION

The present invention relates to a vehicle side extension and, more particularly, to a side extension for increasing the volumetric capacity of a vehicle.

Side extensions have been widely employed in the past on various kinds of vehicle bodies, such as truck bodies and grain wagons, for increasing the volumetric capacity of the vehicle bodies by adding height to the body. Such side extensions have generally included vertical side boards or walls which have a flange at the bottom of the wall which rests upon and is fixed to a complementary flange on the vehicle body itself.

In one form of such body and side extension construction, a flange extends horizontally outwardly from the vehicle body and a complementary outwardly extending flange on the side extension extends outwardly from the side extension walls and rests upon and is fixed to the outwardly extending body flange. Such outwardly extending prior side wall extension construction has the advantage that the material cargo which is to be carried in the body, such as grain or other granular material, will not be retained at the junction of the side extension and vehicle body because the support flanges extend outwardly of the body and a flush surface is presented inwardly of the body and toward the cargo. The disadvantage of such prior outwardly extending flange construction is that the overall volumetric capacity of the vehicle body with the side extension is substantially reduced. The reason for such reduction in volumetric capacity is that road vehicles are generally restricted to an eight foot legal width, thus, no portion of the vehicle body can exceed this width limitation. However, because the outwardly extending flanges of the body are generally on the order of 2½–3 inches wide, the actual cargo carrying capacity of the body is reduced because the width of the body must be reduced by 5–6 inches to accommodate the width of these flanges.

In another form of prior side extension construction, the aforementioned flanges at the top of the vehicle body and the bottom of the side extension are extended inwardly, rather than outwardly. Such inward extension overcomes the capacity loss problem previously mentioned because the walls of the body and the wide extension may be expanded outwardly to the maximum eight foot legal width. However, the disadvantage in this last mentioned construction is that the flanges at the junction of the top of the vehicle body and the bottom of the side extension form a flat ledge upon which granular materials are trapped when the vehicle is unloaded.

The vehicle body side extension incorporating the principles of the present invention overcomes these several disadvantages inexpensively and economically. In a vehicle body side extension incorporating the principles of the present invention, the walls of the vehicle body and the side extension may be spaced from each other by a distance equal to the maximum legal width limitation. Yet, a vehicle body side extension incorporating the principles of the present invention overcomes the problem of material retention at the junction between the side extension and the vehicle body which is experienced in the prior art. Not only does a vehicle body side extension incorporating the principles of the present invention overcome these several problems encountered in the prior art constructions, but a substantial increase in strength of the side extension is simultaneously realized.

In one principal aspect of the present invention, a side extension for increasing the volumetric capacity of a vehicle cargo containing body includes an elongate wall on the extension having upper and lower longitudinal edges and flange means extending along the lower longitudinal edge thereof for mounting the wall on the cargo containing body. The improvement in the side extension comprises the flange means including a first longitudinally extending flange, one longitudinal edge of the first flange being affixed to the wall adjacent the lower longitudinal edge of the wall and extending at an inclined angle from the wall. A second flange has an edge affixed to the first flange adjacent the other longitudinal edge of the first flange and extending angularly from the first flange toward the wall. Fastening means is provided for affixing the second flange to the cargo containing body.

In another principal aspect of the present invention, the aforementioned first and second flanges substantially define a "V" in cross section.

In still another principal aspect of the present invention, the aforementioned side extension includes in combination therewith the vehicle cargo containing body and the body includes a flange at the top thereof which extends inwardly of the body. The second flange rests upon the body flange and is affixed thereto by the fastening means, and the first flange also extends inwardly of the body at an inclined angle to the wall and the body flange.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is a perspective view of a vehicle body having a side extension constructed in accordance with the principles of the present invention;

FIG. 2 is a plan view of the vehicle body and side extension as viewed substantially along line 2—2 in FIG. 1;

FIG. 3 is a broken, enlarged, cross sectioned end elevational view of the vehicle body and side extension as viewed substantially along line 3—3 of FIG. 2; and FIG. 4 is a broken, exploded elevational view of a corner of the vehicle body and side extension as viewed substantially along line 4—4 in FIG. 2.

DESCRIPTION OF THE PREFERRED EMBODIMENT

A preferred embodiment of cargo carrying vehicle body and side extension incorporating the principles of the present invention is shown in the drawings. By way of example, a gravity box or grain wagon is shown in the drawings having a plurality of upright rectangular walls 12 adjacent the top of the grain wagon arranged in a rectangular configuration and a plurality of inclined walls 14 extending downwardly from the vertical walls 12 in hopper fashion leading to a discharge chute 16 at the bottom of the wagon. The discharge chute 16 may be controlled by a sliding gate 18 which may be operated by a hand wheel 20.

The grain wagon thus far described is conventional and the particular construction thereof does not form a part of the present invention. It will also be understood that although the vehicle body is shown in the drawings in the form of a grain wagon, the present invention is equally applicable to other forms of vehicle bodies, such as the body of a truck.

With particular reference to FIG. 1, a side extension structure, generally 22, is shown mounted on top of the vertical walls 12 of the vehicle body 10. The side extension 22 comprises a plurality of vertical, elongate substantially planar walls 24 which extend upwardly from and preferably in the same plane as the body walls 12. The bottom edges of each of the walls 24 have a first flange 26 which is affixed along and adjacent the longitudinal bottom edge of the walls 24 and which extends at an inclined angle downwardly and inwardly of the walls 24 as shown best in FIGS. 3 and 4. A second flange 28 is affixed longitudinally along the lower longitudinal edge of the first flange 26 and extends backward toward the plane of the wall 24 and the exterior of the vehicle to form a "V" in cross section as also best shown in FIGS. 3 and 4. The second flanges 28 rest upon and are affixed to inwardly extending flanges 30 which extend horizontally and inwardly from the vertical walls 12 of the vehicle as best shown in FIG. 3. Such affixation may be by any suitable fastening means, such as bolts 32 spaced along the length of flange 28, as shown in FIG. 3. The width of the flange 28 and the body flange 30 is typically 2½-3 inches. The inner edge of the body flange 30 may also be turned downwardly as shown in FIG. 3 to form a flange 33 for strengthening the body flange 30.

Additional flanges may also be formed on the side extension 22 for the purpose of reinforcing various parts of the side extension. For example, a longitudinally extending flange 34 may extend downwardly from the outer edge of each of the flanges 28 to reinforce the bottom flanges of the side extension and also to assist in positioning the side extension for mounting on the vehicle body. An inwardly extending flange 36 with a downwardly extending lip 38, as best shown in FIG. 3, is also preferably provided to reinforce the top of the side wall extension against forces which are exerted outwardly on the wall 24 by the cargo contained in the vehicle body. All of the aforementioned flanges are preferably formed integrally with the wall 24 or their next adjacent flanges such as by bending. Thus, referring particularly to FIG. 3, the flanges 26 and 36 are formed integrally with the wall 24 by bending the flanges from the wall, flange 28 is formed integrally with flange 26 by bending it backwardly from that flange, and flange 34 is formed integrally with flange 28 by bending it downwardly from that flange.

A plurality of reinforcing elements, such as chains 40, preferably extend between the long side wall extensions as shown in FIG. 2 and are spaced along the length of the walls to reinforce the walls against the outward forces exerted on the extension walls by the material contained between the walls. The chains 40 may be affixed to the walls by any suitable means, such as a link 42 which is welded at 44 to the interior surface of the side walls as shown in FIG. 3.

The walls 24 are preferably joined where they meet at the corners of the side extension by a sheet metal angle iron 46 which is affixed to the intersecting walls 24 at each of the corners by suitable fastening means, such as bolts or rivets 48 as best shown in FIG. 4. The ends 50 and 52 of the angle irons 46 are preferably cut and bent to conform with the angles of the intersecting flanges 26 and 36, respectively, as shown in FIG. 4.

From the foregoing description it will be seen that both the walls 12 of the vehicle body 10 and the walls 24 of the side extension 22 may be positioned at the extreme outer legal width limitations because all fastening and reinforcing structures are positioned to extend into the vehicle body, rather than being located on the exterior of the body. However, it will also be seen that in the preferred embodiment of side extension of the present invention, cargo material will not be retained at the junction between the vehicle body flange 30 and the side extension 22 due to the fact that the flange 26 extends in sloped inclined relationship to the walls to prevent retention of materials during unloading of the vehicle body. The "V" cross sectioned flange construction of the preferred embodiment of side extension of the present invention not only permits maximization of the volumetric capacity of the vehicle body without retention of materials at the junction of the extension and the body, but the walls 24 of the extension are actually strengthened around their perimeter by the "V" shaped flange construction because of the presence of the dual flanges 26 and 28 and the angular relationship of the flanges to each other. Such strengthening actually permits a reduction in the number of reinforcing chains 40 from five which are needed in the typical grain wagon extension construction to three as shown in FIG. 2. Such reduction in the number of chains 40 not only reduces the time and materials needed in manufacturing and assembling the side extension of the present invention, but also reduces the weight of the overall vehicle with its extensions.

It will be understood that the embodiment of the present invention which has been described is merely illustrative of an application of the principles of the invention. Numerous modifications may be made by those skilled in the art without departing from the spirt and scope of the invention.

What is claimed is:

1. A side extension for increasing the volumetric capacity of a vehicle cargo containing body, said extension including an elongate wall having upper and lower longitudinal edges and inner and outer sides and flange means extending along the lower longitudinal edge thereof for mounting the wall on the cargo containing body, whereby the improvement in said extension comprises:

said flange means including a first longitudinally extending flange, one longitudinal edge of said first flange being affixed to said wall adjacent said lower longitudinal edge of said wall and said first flange extending at an inclined angle inwardly and downwardly from the inner side of said wall, the height of said wall being substantially greater than the height of said first flange, and a second flange having an edge affixed to said first flange adjacent the other longitudinal edge of said first flange and extending angularly from said first flange toward the outer side of said wall, and fastening means for affixing said second flange to the cargo containing body.

2. The side extension of claim 1, wherein said first and second flanges substantially define a "V" in cross section.

3. The side extension of claim 1, including a third flange affixed to and extending angularly downwardly from the edge of said second flange opposite said edge which is affixed to said first flange.

4. The side extension of claim 1, including a longitudinal flange affixed to said wall adjacent its upper longitudinal edge and extending angularly to said wall.

5. The side extension of claim 1, wherein said first flange is formed integrally with said wall and said second flange is formed integrally with said first flange.

6. The side extension of claim 5, wherein said flanges are formed integrally by bending.

7. The side extension of claim 1, wherein said first and second flanges substantially define a "V" in cross section, a third flange affixed to and extending angularly downwardly from the edge of said second flange opposite said edge which is affixed to said first flange and a fourth longitudinal flange affixed to said wall adjacent its upper longitudinal edge and extending angularly to said wall.

8. The side extension of claim 7 wherein said first and fourth flanges are formed integrally with said wall, said second flange is formed integrally with said first flange, and said third flange is formed integrally with said second flange.

9. The side extension of claim 8, wherein said flanges are formed integrally by bending.

10. The side extension of claim 1 including in combination therewith said vehicle cargo containing body, said body including a flange at the top thereof which extends inwardly of said body, said second flange resting upon said flange at the top of the body and affixed thereto by said fastening means, and said first flange also extends inwardly of said body and at an inclined angle to said wall and said flange at the top of the body.

11. The combination of claim 10, wherein said wall is substantially vertical.

12. The combination of claim 10, wherein said body is rectangular in plan and each of the four walls of said body includes one of said side extensions thereon.

13. The combination of claim 10, wherein said first and second flanges substantially define a "V" in cross section.

14. The combination of claim 10, including a third flange affixed to and extending angularly downwardly from the edge of said second flange opposite said edge which is affixed to said first flange.

15. The combination of claim 10, including a longitudinal flange affixed to said wall adjacent its upper longitudinal edge and extending angularly to said wall.

16. The combination of claim 10, wherein said first flange is formed integrally with said wall and said second flange is formed integrally with said first flange.

17. The combination of claim 16 wherein said flanges are formed integrally by bending.

18. The combination of claim 10, wherein said first and second flanges substantially define a "V" in cross section, a third flange affixed to and extending angularly downwardly from the edge of said second flange opposite said edge which is affixed to said first flange, and a fourth longitudinal flange affixed to said wall adjacent its upper longitudinal edge and extending angularly to said wall.

19. The combination of claim 18, wherein said first and fourth flanges are formed integrally with said wall, said second flange is formed integrally with said first flange, and said third flange is formed integrally with said second flange.

20. The side extension of claim 19, wherein said flanges are formed integrally by bending.

21. The side extension of claim 1 comprising four of said walls which intersect each other to define a rectangular enclosure.

22. The side extension of claim 21, wherein said walls are joined together at their intersection by angle members.

23. The side extension of claim 22, wherein said first flanges of said walls also intersect and are joined together by said angle members.

24. The side extension of claim 1, wherein said wall is substantially planar.

* * * * *